(12) United States Patent
Simkulet et al.

(10) Patent No.: US 7,649,690 B2
(45) Date of Patent: Jan. 19, 2010

(54) INTEGRATED PANORAMIC AND FORWARD OPTICAL DEVICE, SYSTEM AND METHOD FOR OMNIDIRECTIONAL SIGNAL PROCESSING

(75) Inventors: Michelle D. Simkulet, Cohoes, NY (US); Jiayin Ma, Loudonville, NY (US); Jason E. Smith, Latham, NY (US)

(73) Assignee: InterScience, Inc., Troy, NY (US)

( * ) Notice: Subject to any disclaimer, the term of this patent is extended or adjusted under 35 U.S.C. 154(b) by 366 days.

(21) Appl. No.: 10/597,539

(22) PCT Filed: Feb. 3, 2005

(86) PCT No.: PCT/US2005/003215
§ 371 (c)(1),
(2), (4) Date: Jul. 28, 2006

(87) PCT Pub. No.: WO2005/078502
PCT Pub. Date: Aug. 25, 2005

(65) Prior Publication Data
US 2008/0247061 A1    Oct. 9, 2008

Related U.S. Application Data

(60) Provisional application No. 60/542,736, filed on Feb. 6, 2004.

(51) Int. Cl.
G02B 27/10 (2006.01)
(52) U.S. Cl. .................. 359/627; 359/633; 359/850
(58) Field of Classification Search ............. 359/627, 359/633, 850, 853, 856, 857, 728, 729, 730, 359/731
See application file for complete search history.

(56) References Cited

U.S. PATENT DOCUMENTS

| 2,430,595 | A | | 11/1947 | Young |
| 4,695,139 | A | * | 9/1987 | Bagby et al. ............. 359/366 |
| 6,130,783 | A | * | 10/2000 | Yagi et al. ................ 359/627 |
| 6,333,826 | B1 | * | 12/2001 | Charles .................... 359/725 |
| 6,392,687 | B1 | | 5/2002 | Driscoll, Jr. et al. |

(Continued)

FOREIGN PATENT DOCUMENTS

EP    0816891 A1    1/1998

(Continued)

*Primary Examiner*—Timothy J Thompson
(74) *Attorney, Agent, or Firm*—Jay R. Yablon; Michelle D. Simkulet

(57) ABSTRACT

A device, system and method integrating forward and panoramic fields is disclosed, comprising: a primary reflector, comprising a convex surface in relation to the forward field, reflective on at least part of the convex surface; a secondary reflector, forward of the primary reflector relative to the forward field, reflective on at least part a surface thereof facing rearward toward the primary reflector; a primary reflector hole in the primary reflector, substantially centered about an optical axis of the apparatus; and a secondary reflector hole in the secondary reflector, substantially centered about the optical axis.

38 Claims, 5 Drawing Sheets

U.S. PATENT DOCUMENTS

| | | |
|---|---|---|
| 6,419,626 B1 * | 7/2002 | Yoon .......................... 600/109 |
| 6,424,377 B1 | 7/2002 | Driscoll, Jr. et al. |
| 6,449,103 B1 | 9/2002 | Charles |
| 6,480,229 B1 | 11/2002 | Driscoll, Jr. et al. |
| 6,611,282 B1 | 8/2003 | Trubko et al. |
| 6,621,516 B1 | 9/2003 | Wasson et al. |
| 6,744,569 B2 | 6/2004 | Geng |
| 6,789,908 B2 | 9/2004 | Garcia |
| 6,791,598 B1 | 9/2004 | Luken et al. |
| 6,793,356 B2 | 9/2004 | Kumata et al. |
| 6,809,887 B1 | 10/2004 | Gao et al. |
| 6,833,843 B2 | 12/2004 | Mojaver et al. |
| 6,852,079 B2 * | 2/2005 | Miyano ...................... 600/178 |
| 2002/0121574 A1 | 9/2002 | Davis |
| 2004/0254424 A1 * | 12/2004 | Simkulet et al. ............ 600/176 |
| 2005/0018069 A1 * | 1/2005 | Krogmann et al. .......... 348/340 |
| 2005/0088435 A1 * | 4/2005 | Geng .......................... 345/419 |

FOREIGN PATENT DOCUMENTS

| | | |
|---|---|---|
| EP | 1452899 | 9/2004 |
| GB | 867251 A | 5/1961 |
| WO | WO-02-059676 A1 | 8/2002 |
| WO | WO-03-042743 A1 | 5/2003 |
| WO | WO-03-096078 A2 | 11/2003 |

* cited by examiner

INTEGRATED PANORAMIC AND FORWARD OPTICAL DEVICE, SYSTEM AND METHOD FOR OMNIDIRECTIONAL SIGNAL PROCESSING

FIELD OF THE INVENTION

This invention relates to the field of omnidirectional optical systems. The optical system is comprised of two paths, panoramic and forward, seamlessly integrated on a single plane. The total field of view is comprised of the forward field of view and the panoramic field of view.

BACKGROUND OF THE INVENTION

There is much prior art for optical systems that provide omnidirectional imaging. The disclosure herein has some unique characteristics that are not covered in any prior art and that provide a unique new capability to imaging systems and omnidirectional optical components in general. Jeffrey Charles has several U.S. patents on the subject including U.S. Pat. No. 6,333,826 and U.S. Pat. No. 6,449,103, BeHere Corporation has several US patents including U.S. Pat. No. 6,392,687, U.S. Pat. No. 6,424,377 and U.S. Pat. No. 6,480,229, and Remote Reality has U.S. Pat. No. 6,611,282.

The patents by Jeffrey Charles focus solely on the panoramic field of view, and efforts to maximize that field of view for near field applications. The Charles' patents include a frontal exclusion zone of about 60 degrees that can be tapered approaching the far field by the use of a torroidal-shaped reflector. Although this exclusion zone eventually disappears as a point where the boundaries of the panoramic field meet, there is no account in the patent for the overlapping area past the point of convergence in the processing or interpretation of the image. The minor disclosure of including forward optics to image the frontal exclusion zone makes no mention of details of how to match the magnification or the relative F/# of the integrated images. Nor is there a means of interpreting or processing the overlapping images. The mere inclusion of forward viewing lenses does not automatically lend itself to an easily interpretable image. The focus of the optical system is near field prior to the overlap. Although there is provision to include the forward viewing optics to image the frontal exclusion zone, there will only be one point (or one radial distance) in which the frontal zone and the panoramic zone exist with either no gap or no overlap.

The BeHere technology also concentrates on the panoramic field of view and only makes provisions to extend the panoramic view as far forward as possible by changing the shape of the reflector. By placing a dimple in the apex of the parabolic reflector, imaging beyond the secondary reflector is achieved in the far field. These inventions provide no means for forward imaging in the near field.

The Remote Reality invention is a super wide-angle panoramic imaging apparatus that claims up to a 260° vertical field of view using a two reflector configuration. The invention includes an undefined blind spot along the optical axis. The invention claims a single view point while also having a substantially flat and stigmatic image plane.

Below are some summarizing details of each of the patents referenced above.

U.S. Pat. No. 6,333,826 Jeffrey R. Charles: Omniramic Optical System Having Central Coverage Means which is Associated with a Camera, Projector or Similar Article
  single and two reflector embodiments
  two reflector embodiment produces frontal exclusion zone ~60 degrees
  produces annular image
  minimization of frontal exclusion zone using torroidal shape primary reflector
  achieves far field imaging with triangular shape frontal exclusion zone, beyond point, overlap in annular image
  discloses in specification only (column 26, line 57-column 27, line 9) use of supplemental lenses in front of secondary mirror transparent area to image area greater than or equal to frontal exclusion zone, produces concentric images
  overlapping images to produce 3D info
  FOCUS: maximization of annular image boundaries, minimization of frontal exclusion zone, far field imaging, overlap of zones to produce 3-D image information U.S. Pat. No. 6,449,103 Jeffrey R. Charles: Solid Catadioptric Omnidirectional Optical System having Central Coverage Means Which is Associated with a Camera, Projector, Medical Instrument or Similar Article
  solid optical substrate with primary and secondary internal reflectors and outer surface being convex refracting surface
  combination of primary reflector shape and outer refracting surface allows for imaging a point a finite distance in front of said optical system—thereby allowing for far field imaging only—but also subject to image overlapping beyond that finite point
  purpose of the convex refracting surface, which would be extremely difficult or even impossible to manufacture, is to extend the panoramic field of view boundaries.
  Claims 31-36 deal with solid optical substrate with primary and secondary internal reflectors in which secondary reflector has a transparent central zone with a concave surface or lenses to image central exclusion zone.

U.S. Pat. No. 6,392,687 BeHere Corp.: Method and Apparatus for Implementing a Panoptic Camera System
  Two reflector design
  Main reflector consists of a paraboloid shape with a dimple on the apex such that the main reflector can capture light from behind a second reflector
  Details two cameras together to see an entire sphere and a stereo vision panoptic camera
  Similar to Charles' patent, still leaves a zone just beyond secondary reflector which is not viewable U.S. Pat. No. 6,424,377 BeHere Corp.: Panoramic Camera
  Single reflector design—mirror is parabolic cone shape
  Includes imaging camera, astigmatism correction lens, field flattening lens and objective lens
  Multiple sensors on same plane in mosaic pattern to achieve desired resolution
  Alternative embodiment 2 reflector design—camera housed within parabolic mirror
  Alternative embodiment single and 2 reflector designs whereas the parabolic reflector is the inside surface of a curved block of transparent material with refractive properties
  annular image presentation techniques including conversion to rectangular coordinates
  claims apparatus for capturing panoramic images
  claims apparatus with parabolic first reflector and light capture linearly proportional to angle of incidence on mirror U.S. Pat. No. 6,480,229 BeHere Corporation: Panoramic Camera
  single reflector convex mirror incorporating a beamsplitter to send annular image to two different electronic image capture devices Alternative embodiment 2 reflector design—camera housed within parabolic mirror Alternative embodiment single and 2 reflector designs whereas the parabolic reflector is the inside surface of a curved block of transparent material with refractive properties annular image presentation techniques including conversion to rectangular coordinates U.S. Pat. No. 6,611,282 Remote Reality: Super Wide-Angle Panoramic Imaging Apparatus two reflector configuration, primary reflector is a hyperboloid and secondary reflector is concave achieves up to a 260° vertical field of view which includes an undefined blind spot along the optical axis immediately behind the secondary reflector claims image is free of field curvature effects and astigmatic effects secondary reflector is an ellipsoidal or spherical mirror alternative embodiment includes reflective elements housed in solid optical block image mapable into Cartesian coordinate system Other prior art which defines the general state of the art but is not of particular relevance includes: U.S. Pat. No. 6,621,516 to Wasson, et al. for a Panoramic Pipe Inspector; U.S. Pat. No. 6,744,569 to Geng for a Method and Apparatus for Omnidirectional 3-D Imaging; U.S. Pat. No. 6,789,908 to Garcia for a Confocal Ellipsoidal Mirror System for Wide Field of View Imaging, U.S. Pat. No. 6,791,598 to Luken, et al. for Methods and Apparatus for Information Capture and Stereoscopic Display of panoramic Images; U.S. Pat. No. 6,793,356 to Kumata, et al. for an Omnidirectional Vision Sensor; U.S. Pat. No. 6,809,887 to Gao, et al. for an Apparatus and Method for Acquiring Uniform-Resolution Panoramic Images; and U.S. Pat. No. 6,833,843 to Mojaver, et al. for a Panoramic Imaging and Display System With Canonical Magnifier.

SUMMARY OF THE INVENTION

The objective of the device, system and method for omnidirectional signal processing disclosed here is to provide an integrated panoramic/forward view imaging system that delivers a coplanar omnidirectional image to a means of image display and/or recording. The present invention is comprised of a two optical path system that is combined on a single image plane. This device, system and method achieves matched magnification between the forward and panoramic images, relatively seamless boundaries with no overlap or blind spot, and a total field of view approximating 270 degrees vertically (forward) about the entire 360-degree periphery. The invention can be utilized for surveillance applications as a pole mounted or ground mounted system or implemented in a stand-alone unit. The optical system can be miniaturized for endoscope and borescope implementation or alternatively enlarged for pipe inspection or other large-scale inspection implementations. An alternative non-imaging embodiment of the present invention can be applied to optical free space communication as an omnidirectional optical antenna.

In particular, disclosed is a device, system and method integrating forward and panoramic fields, comprising: a primary reflector, comprising a convex surface in relation to the forward field, reflective on at least part of the convex surface; a secondary reflector, forward of the primary reflector relative to the forward field, reflective on at least part a surface thereof facing rearward toward the primary reflector; a primary reflector hole in the primary reflector, substantially centered about an optical axis of the apparatus; and a secondary reflector hole in the secondary reflector, substantially centered about the optical axis.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) summarized below.

DETAILED DESCRIPTION

Purpose and Applications

The device, system and method disclosed herein is configured to achieve the widest field of view possible, including rear-viewing capabilities, while minimizing distortion. It does not rely on panning and tilting mechanisms. Current wide field of view, non-moving, optical systems typically consist of fish eye optical systems. The distortion of fish eye optical systems is so great that they are not suitable for many imaging applications. The distortion is created by the non-uniform refraction of the light rays across the field of view. The boundaries of the field of view typically appear much more distorted than the central area of the field of view since the geometry of the optical system is meant to maximize the field of view. Advances in alternative panoramic imaging optical systems present a means of imaging the periphery, but typically not the entire hemisphere in front of the imager. Single and dual reflector optical systems exist that provide peripheral imaging, but lack forward imaging. Pan and tilt optical systems provide the means to cover the same field of view, but require mechanical motion and do not present the entire field of view in a single instance on the image plane. For many applications the lack of constant viewing of the entire field of view or the requirement of mechanical motion is unacceptable. This disclosure has applications including but not limited to surveillance, safety monitoring, industrial inspection, and medical endoscopy.

Optical System

Figure 1:
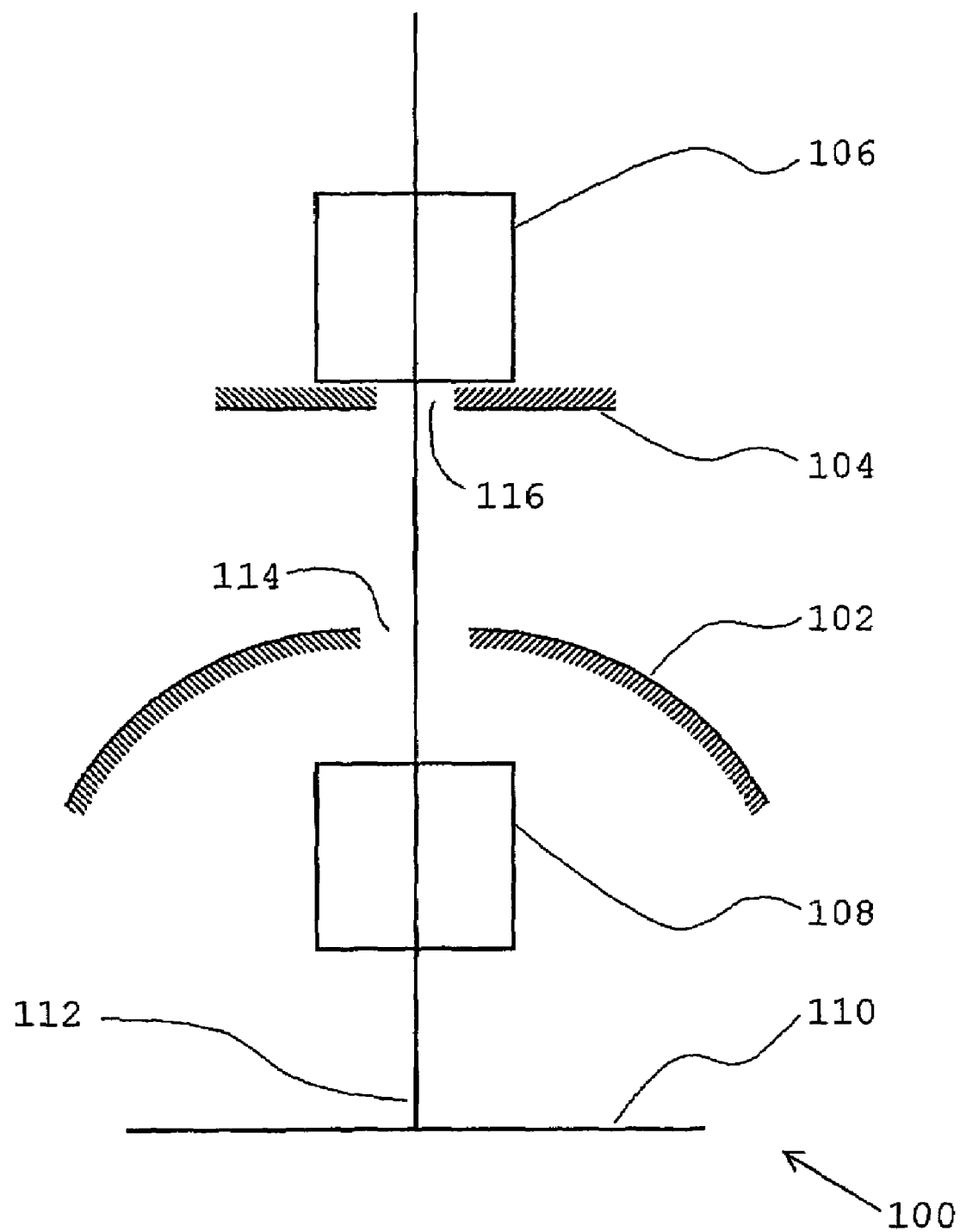
FIG. 1 is a two dimensional plan view of the optical system of a preferred embodiment of the invention.
Figure 2:
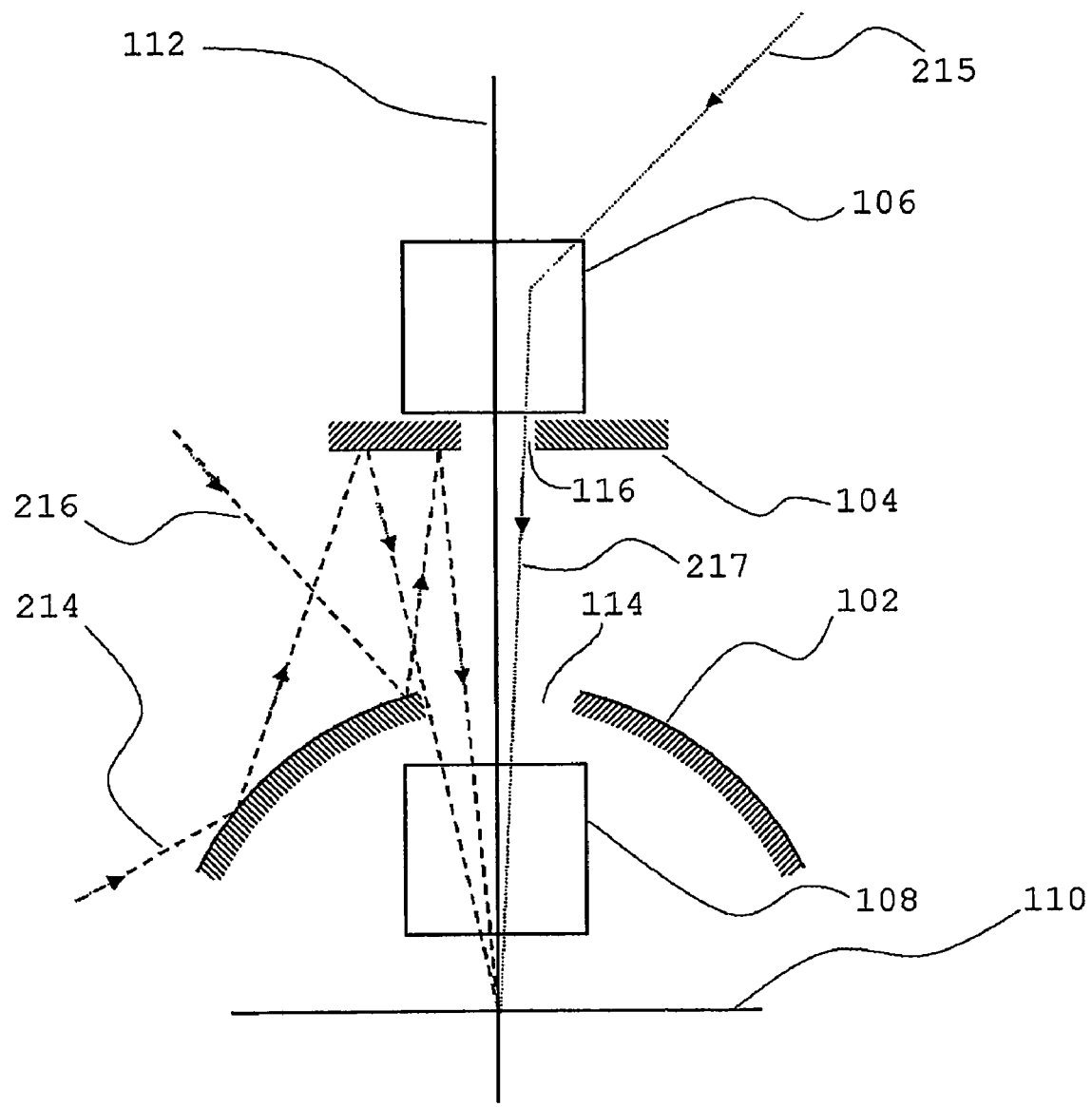
FIG. 2 is a two dimensional schematic showing the ray trace of the panoramic component of the optical system in said preferred embodiment.

The basic configuration disclosed herein is described with reference to FIGS. 1 and 2. FIG. 1 shows the layout of the omnidirectional optical system 100 and FIG. 2 shows the light path through this system. The omnidirectional optical system 100 comprises a primary reflector 102, a secondary reflector 104, a forward imaging lens group 106, a focusing lens group 108, an image plane 110, all positioned as illustrated in relation to an optical axis 112. The fields of view imaged by the omnidirectional optical system 100 are detailed in FIG. 3. The total field of view of the omnidirectional optical system 100 comprises a forward field of view 318 seamlessly bounded by a panoramic field of view 320 that can include a significant back angle field of view 322.

As illustrated, primary reflector 102 comprises a convex surface in relation to the forward field, reflective on at least part of said convex surface as illustrated by the solid arc on the forward edge of 102. As illustrated, secondary reflector 104 is forward of the primary reflector relative to the forward field, reflective on at least part a surface thereof facing rearward toward said primary reflector, as illustrated by the solid line on the trailing edge of 104. Forward imaging lens group 106, as illustrated, comprises at least one field collecting element (e.g., lens), forward of secondary reflector 104 relative to the forward field, substantially centered about optical axis 112. Focusing lens group 108, also as illustrated, comprises at least one field focusing element (i.e., lens), rearward of primary reflector 102 relative to the forward field, substantially centered about optical axis 112

In the preferred embodiment, primary reflector 102 has a substantially spherical geometry, with a primary reflector hole 114 through the central apex centered on the optical axis 112. Both the geometry (radius of curvature) of the primary reflector 102 and the diameter of the primary reflector hole 114 are used to control the overall total field of view the optical system 100 can achieve and also the balance in the total field of view between the forward field of view 318 and the panoramic field of view 320. For example, not limitation, the proportion of the hole diameter to the reflective spherical surface is approximately 1:4.2, though this can be varied as needed in relation to the particular intended application. The radius of curvature of the primary reflector 102 in this embodiment is 20.102 mm, but again, this varies by application. The spherical geometry of the primary reflector 102 is primarily for ease of manufacturing and low cost production.

More complex geometries, such as a parabolic geometry, which are more difficult to manufacture, can be incorporated as an alternative when needed for the particular application. Alternative embodiments comprising a primary reflector 102 with such alternative convex geometries, still include the primary reflector hole 114 along the optical axis 112. In such alternative embodiments, primary reflector 102 is a convex hyperbolic or convex parabolic reflector capable of forming a central panoramic catadioptric image. The minimal distortion caused by the focusing lens group 108 can be compensated with the correct bending power from the parabolic or hyperbolic primary reflector 102. This alternative embodiment eliminates the minimal distortion aberration that exists when one employs the easier-to-manufacture spherical geometry for primary reflector 102.

In the preferred embodiment, secondary reflector 104 has a substantially flat or planar geometry, with a secondary reflector hole 116 centered on the optical axis 112. Secondary reflector 104 is positioned forward of primary reflector 102 in relation to the forward field (i.e., with respect to image plane 110) and is substantially centered along the optical axis 112, as illustrated. The position of the secondary reflector 104, the geometry of the secondary reflector 104 and the diameter of the secondary reflector hole 116 contribute to the definition of the boundaries of the individual forward and panoramic fields of view (318 and 320 respectively). Specifically, these parameters contribute to the definition of the forward boundary of the panoramic field of view 320 and the rear boundary of the forward field of view 318. The proportion of the secondary reflector hole 116 diameter to the reflective surface diameter of for primary reflector 102 is approximately 1:2.86 in the illustration, but this too can be varied as needed for particular intended applications. The planar reflector geometry is easily manufactured. Alternative geometries for secondary reflector 104, such as concave or convex, can be employed to tailor the optical system to meet specific fields of view or resolution requirements. Alternative embodiments comprising secondary reflector 104 with such alternative convex or concave geometries, still include secondary reflector hole 116 along optical axis 112.

Figure 3:
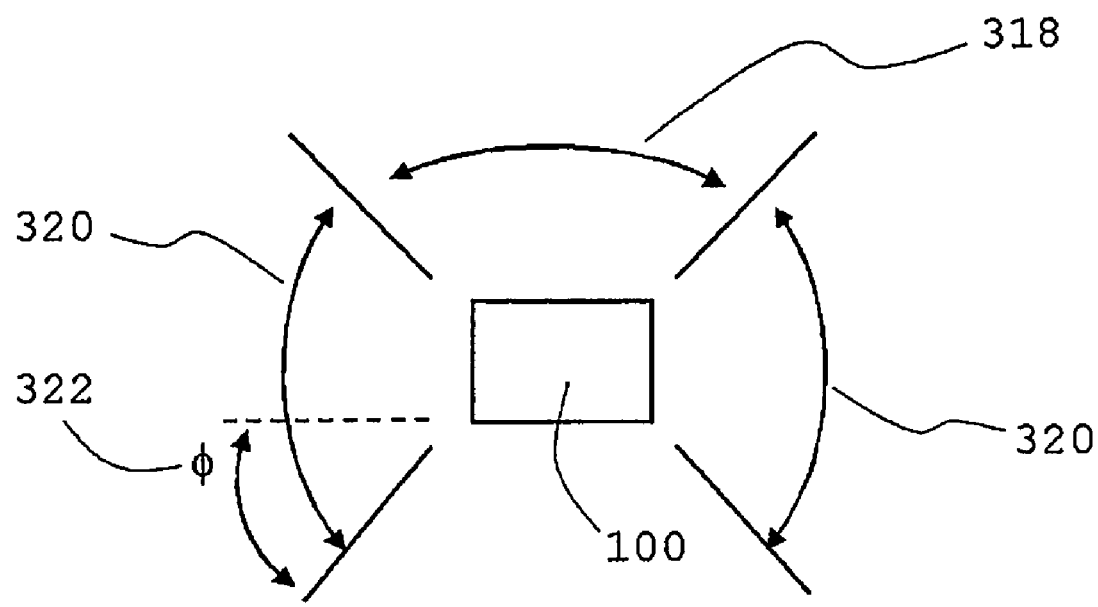
FIG. 3 is a schematic representation of the fields of view attainable with the present invention.

FIG. 2 specifically details the ray path through both the panoramic and forward components of the omnidirectional optical system 100. For illustration simplicity, the panoramic ray path is shown only on the left side of FIG. 2 and the forward ray path is shown on the right side. This again is just for illustration, because both forward and panoramic rays are processed from all directions. Referring also to FIG. 3, FIG. 2 details the rays at the rear boundary extremes of the panoramic field of view 320, inbound along path 214. A ray 216, forward but along the periphery, traces a path to the primary reflector 102, is then reflected to secondary reflector 104, and is again reflected through primary reflector hole 114 along the optical axis 112. It then passes to the focusing lens group 108 and the image plane 110, see FIG. 1. Similarly, the rear boundary ray 214 traces the path from the periphery to the primary reflector 102, to the secondary reflector 104, and through primary reflector hole 114 to focusing lens group 108 and onto image plane 110, again refer also to FIG. 1. On the right side of FIG. 2, the path of a forward ray 215 traces a path through the forward imaging lens group 106, in which it is refracted, then passes through the secondary reflector hole 116, through primary reflector hole 114, through focusing lens group 108 and onto image plane 110.

An integrated function of both the primary reflector 102 and secondary reflector 104 is to ensure the seamless boundary between the forward field of view 318 and the panoramic field of view 320. The geometry and size of the primary and secondary reflectors 102, 104 define the boundaries of the panoramic field of view 320 and is matched exactly to the boundary of the forward field of view 318 with no overlap and no gap. Additionally, the geometry of the primary and secondary reflectors 102, 104 defines the F/#[1] of the panoramic field of view 320. The F/# can be interpreted as the brightness in the resultant image presented on the image plane 110 and the speed of the optical system. By matching the F/# of the panoramic-only optical system (primary reflector 102 plus the secondary reflector 104) with the F/# of the forward-only optical system (forward imaging lens group 106), the brightness appears consistent over the entire image on the image plane 110.

[1]The expression denoting the ratio of the equivalent focal length of a lens to the diameter of its entrance pupil. See, e.g., http://www.photonics.com/dictionary/lookup/XQ/ASP/url.lookup/entrynum.5806/letter.f/pu./QX/lookup.htm Forward imaging lens group 106 is designed to collect the forward field of view 318 and transfer it through the focusing lens group 108 to the image plane 110, so that the image striking image plane 110 captures a smooth, integrated representation of the fields of view 318, 320 and 322 with minimal gaps or overlaps. The forward imaging lens group 106 which is selected for a given application defines the boundaries of forward field of view 318 boundaries and also defines the F/# of the forward field of view 318. In the preferred embodiment, forward field of view 318 spans approximately 80 degrees, +/−40 degrees about optical axis 112. The forward imaging lens group 106 is placed directly behind the secondary reflector 104 with respect to the image plane 110 (i.e., directly forward of secondary reflector 104 with respect to the forward field of view) and is substantially centered on optical axis 112. In the preferred embodiment the lens elements in the forward imaging lens group 106 are spherical optical components fabricated of conventional optical materials such as BK7. The use of spherical optics and conventional materials lends to lower fabrication costs and cost effective system implementation. Of course, other suitable field collecting elements known or which may become known in the art may also be suitable for lens group 106 for a given application.

Focusing lens group 108 is centered along optical axis 112 and is placed in between primary reflector 102 and the image plane 110. The focusing lens group 108 collects the panoramic field of view 320 from the secondary reflector 104 together with the forward field of view 318 from the forward imaging lens group 106, as an integrated image. It is the function of the focusing lens group 108 to focus the two independent optical paths from the panoramic field of view 320 and the forward field of view 318 onto a single image plane 110 and to control the image aberrations on this coplanar image. In other words, in general, the geometry and diameter of primary reflector 102, the geometry of secondary reflector 104, the diameter of primary reflector hole 114, the diameter of secondary reflector hole 116, particular optical properties of forward imaging lens group 106, and the particular optical properties of focusing lens group 108, as well as the separations of these various elements one from another along optical axis 112, combine as free parameters to determine exactly what sort of image is delivered to image plane 112, and are varied based on the particular application.

In the preferred embodiment, primary reflector 102 houses a portion of the focusing lens group 108 in the concave underside of its reflective surface. In the preferred embodiment the lens elements in the focusing lens group 108 are spherical optical components fabricated of conventional optical materials such as BK7. The use of spherical optics and conventional materials lends to lower fabrication costs and cost effective system implementation. Of course, other suitable focusing elements known or which may become known in the art may also be suitable for lens group 108 for a given application.

Image/Detection Plane

Figure 4:
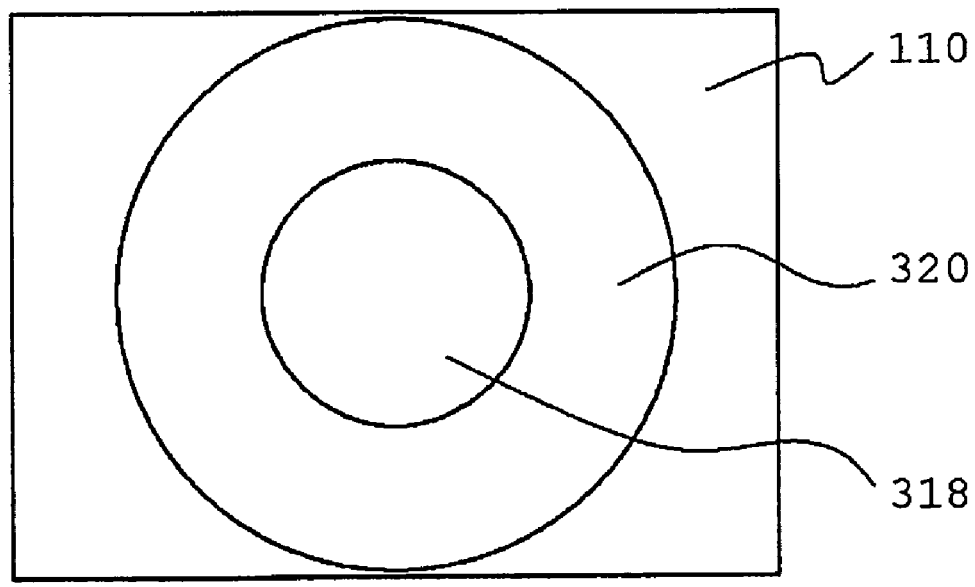
FIG. 4 illustrates the projection of the captured image onto the image plane.

The forward field of view 318 and panoramic field of view 320 are integrated on a single image/detection plane 110 to be presented as a single image. FIG. 4 shows a schematic representation of the integrated image on the image plane 110 with the coplanar presentation of the forward field of view 318 and the panoramic field of view 320. The coplanar single image presents many options for post processing not available to imaging systems that require panning and tilting to cover the same total field of view. Image processing techniques can be employed to remap the integrated image on image plane 110 and present it to the user in a variety of formats. The image plane 110 is the focus of the coplanar integration of the forward field of view 318 and the panoramic field of view 320. As shown in FIG. 4 the forward field of view 318 is concentrically presented with the panoramic field of view 320. Although a boundary between the forward field of view 318 and the panoramic field of view 320 is illustrated on the schematic in FIG. 3, this is only to illustrate the difference between the image collected by the forward imaging lens group 106 and that collected by the primary reflector 102. In actuality the omnidirectional optical system 100 produces a continuous, integrated image on image plane 110 in which the boundary between the fields of view is not evident. The image plane 110 preferably comprises a visible or near-infrared optical/imaging detector such as a CCD or CMOS camera or detector. The preferred embodiment is optimized for integration with a 640×480 output file size on a ⅓" format sensor, though this is illustrative and not in any way limiting. Alternative embodiments are optimized for visible and near-IR sensors of various sizes and resolutions. The sensors can either be analog or digital and can range from the lowest resolution, approximately 160×120 pixels to the highest resolution, which at this time is greater than a 6 megapixel array and may increase in the future within the scope of this disclosure and its associated claims.

Fields of View

The illustrated embodiment provides an omnidirectional optical system 100 with a substantially hyper-hemispherical field of view that extends to a maximum 270 degrees vertically (forward) and 360 degrees peripherally as shown in FIG. 3. This field of view is achieved by seamlessly integrating a forward field of view 318 with a panoramic field of view 320 on a single image plane 110. The forward and panoramic fields of view 318, 320 are non-overlapping and there is no blind spot or gap between them. The boundaries of the forward and panoramic fields of view 318, 320 are relatively parallel; in particular, they gently converge and eventually overlap. The forward field of view 318 extends about 80 degrees total (+/−40 degrees from the optical axis). The panoramic field of view 320 extends about 95 degrees (50 degrees above the horizon and 45 degrees below the horizon. The magnification, and the F/#, are matched between the forward and panoramic fields of view 318, 320. The image formed on the image plane 110, therefore, seems continuous, with no differences in brightness or size, and no distortion at the seamless boundaries. The geometries of primary reflector 102 and secondary reflector 104 define the extent of the panoramic field of view 320. Similarly the optical design of the forward imaging lens group 106 defines the extent of the forward field of view 318. The extent of each the forward field of view 318 and the panoramic field of view 320 can be tailored to meet the exact specifications of the application in which the omnidirectional optical system 100 is being used.

Size and Materials

The invention has been experimentally demonstrated at a diameter of approximately 40 mm and a height of 62.5 mm for a omnidirectional optical system 100 optimized for a visible light images. The invention disclosed can be scaled in diameter to accommodate different application requirements. It has been scaled, experimentally, to a diameter of 2.7 mm for endoscope/borescope applications. The exact specification of materials is application dependent. However, for example, and without limitation, the preferred embodiment comprises a primary reflector 102 that is BK7 glass with a protected aluminum coating, a secondary reflector 104 made of polished aluminum, and all optical elements in the forward imaging lens group 106 and the focusing lens group 108 made of standard glass with an antireflection coating deposited on them.

Alternative Embodiments

Aside from the alternative embodiments listed above relating to individual component specification and application customization, additional embodiments are now discussed. One alternative embodiment comprises the omnidirectional optical system 100 optimized for integration with an infrared imaging sensor for thermal or far-infrared imaging, such as but not limited to an uncooled microbolometer or a focal plane array. This detector/sensor is inserted at the image plane 110 of the optical system 100. The wavelength differences in the signal being transmitted and processed require different optical materials, which have different optical properties and a system optimized to the microbolometer size and resolution. At this time the highest resolution for infrared uncooled microbolometer is 320×240 pixels. Specifically, distinct changes in the optical materials are necessary to account for the infrared band of the electromagnetic spectrum. In this embodiment, the primary reflector 102 and the secondary reflector 104 preferably are coated in gold. This is the standard for IR reflective coatings and is widely available from optical manufacturers. The choice of materials for the optical elements in the forward imaging lens group 106 and the focusing lens group 108 include, but are not limited to, Zinc Selenide (ZnSe), Sodium Chloride (NaCl) and Cesium Bromide (CsBr).

Figure 5:
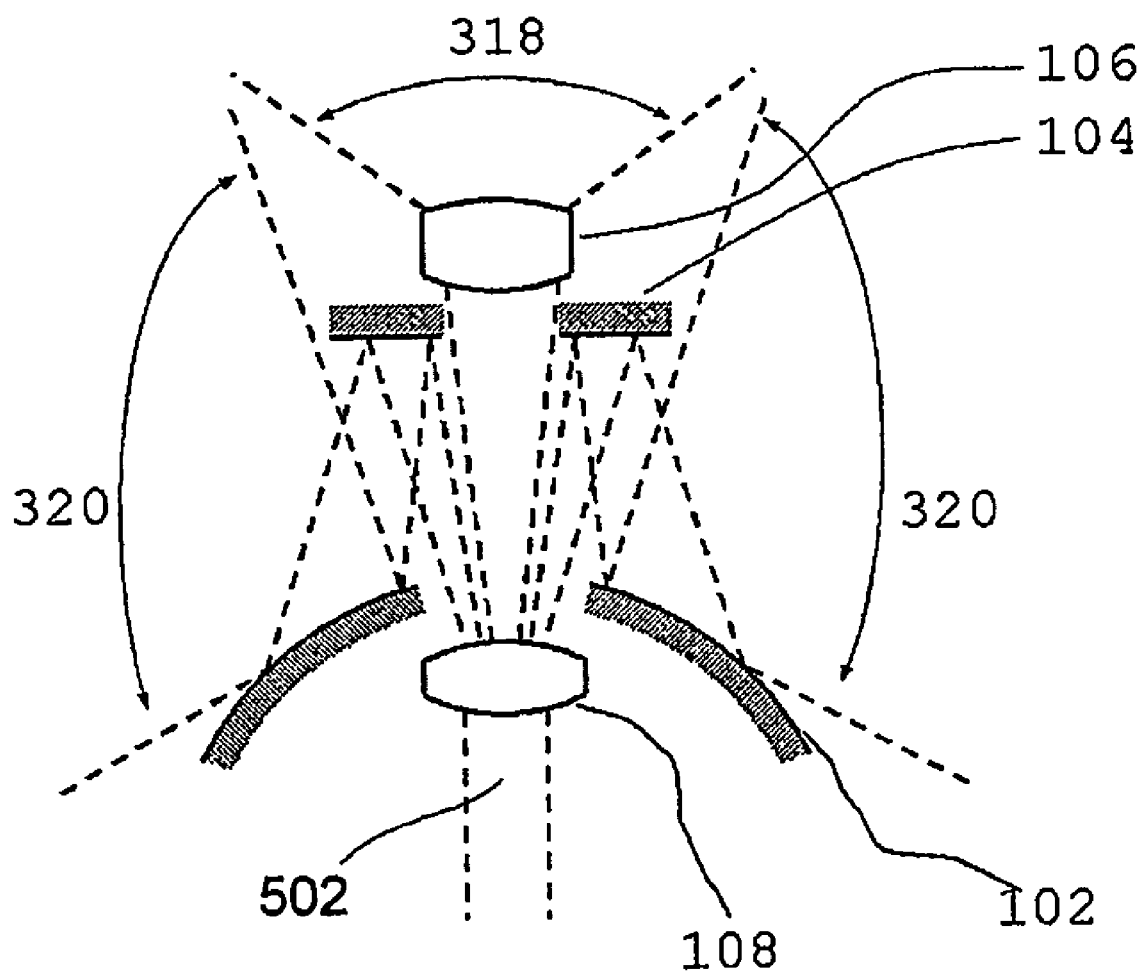
FIG. 5 is a two-dimensional schematic of an alternative embodiment of the present invention as an afocal optical system for non-imaging applications. The ray traces are similar to those which occur in imaging embodiments.

An additional alternative embodiment of the present invention is implementation of the omnidirectional optical system in a non-imaging application for omnidirectional free space communication. This alternative embodiment in which the omnidirectional optical system 100 is used as an omnidirectional optical antenna is depicted in FIG. 5, though it is pointed out that the light ray paths shown in FIG. 5 as well as the overall combination of elements is configured in the same manner as FIG. 1.

The primary components of the omnidirectional optical system 100 remain the same in this alternative embodiment and comprise primary reflector 102, secondary reflector 104, forward lens group 106 and focusing lens group 108. In this embodiment, the primary reflector 102 and the secondary reflector 104 are large area light collectors to feed light from the panoramic field of view 320 into the focusing lens group 108. Second, the forward lens group 106 is used as a wide-angle objective to bend the light from the wide-angle forward field of view 318 into the focusing lens group 108. Third, the focusing lens group 108 comprises a set of front positive lenses and a set of rear negative lenses.

In this alternative embodiment, the optical system is modified to be employed as an afocal system. This modification include only the focusing lens group 108. In other words, this system comprises at least one afocal element 108, rearward of primary reflector 102 relative to the forward field, substantially centered about the optical axis 112, as illustrated. The image plane 110 is set at infinity, which is represented by the parallel rays 502 (rather than focused) emanating from the focusing lens group 108 in FIG. 5. The afocal magnification is maintained at an optimized level, which depends on the detector/transmitter size and the overall dimensions of the optical system.

In this alternative embodiment, for this long-range optical communication antenna application, especially for high data rate communication systems, a diffraction limited optical system design is required. If the design is not diffraction limited, wavefront errors may overlap the adjacent optical signals and confuse the decision-making circuits when the data rate reaches a certain level. The optical system forms the transmit beam and any errors can degrade the beam quality. Optimization depends upon the on lens configuration for the forward lens group 106 and the focusing lens group 108 and glass materials selection.

In this alternative optical antenna embodiment, the image plane/detector plane 110 must be distortion free. For an afocal optical system, the power distribution on image plane 110 is expected to be constant across the total field of view, which comprises the forward field of view 318 plus the panoramic field of view 320. Any distortion will alter the transmitter power distribution, and will saturate the detector or weaken the signal strength. As mentioned above, the distortion free omnidirectional optical design is achievable by using either a convex hyperbolic or a convex parabolic mirror as the primary reflector 102.

Figure 6:
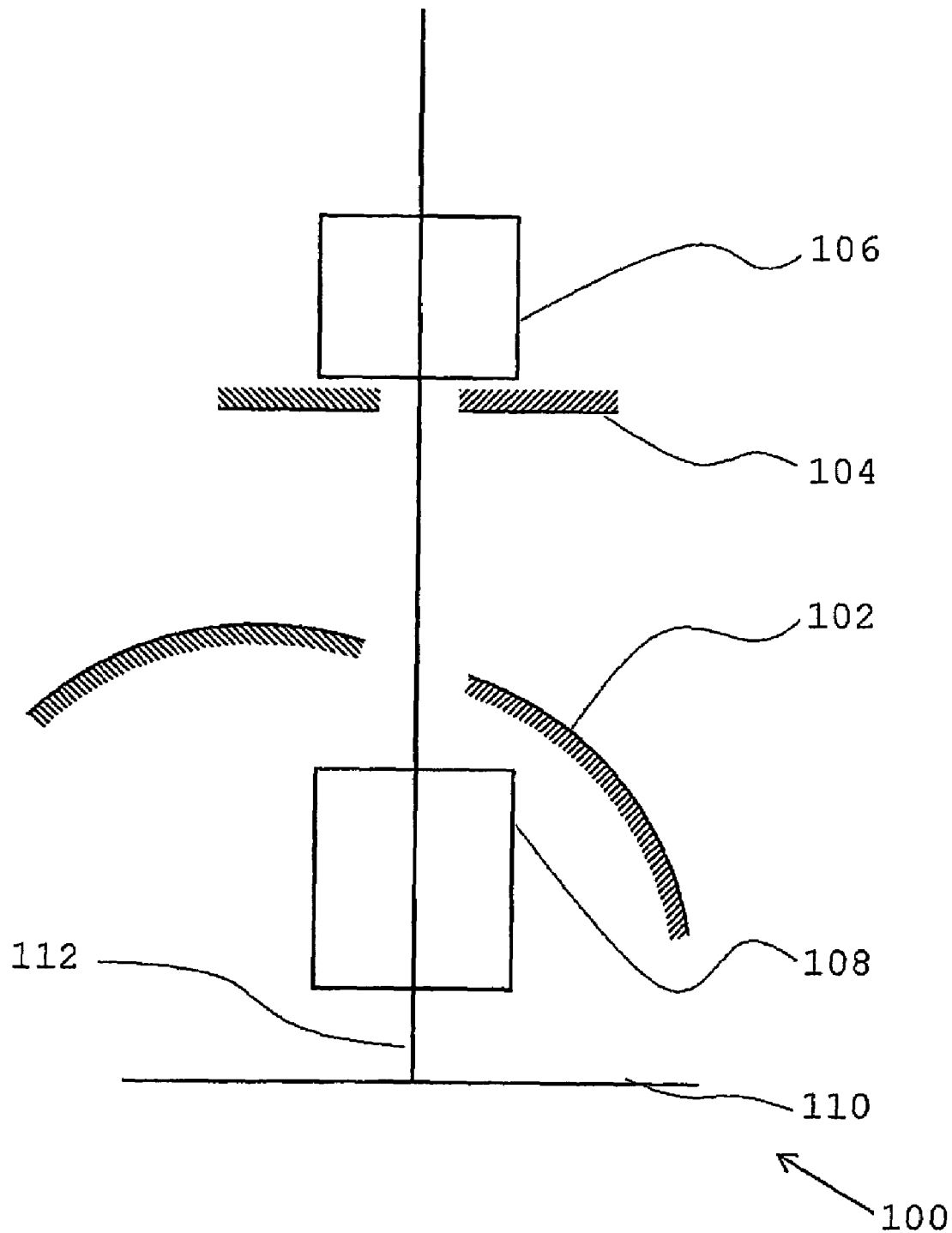
FIG. 6 is a two-dimensional schematic of an alternative embodiment comprising directional zooming capabilities.

A final alternative embodiment includes directional zooming. Due to the unique configuration of the disclosed omnidirectional optical system 100, directional zooming in the panoramic field of view 320 can be achieved by tilting the primary reflector 102 relative to optical axis 112, which is typically spherical or alternatively parabolic or parabolic. This alternative embodiment is illustrated in FIG. 6. Tilting the primary reflector 102 in the direction of interest changes the area on the primary reflector 102 that the image rays strike and the total path length, thereby changing the size of the image on the image plane 110. The forward field of view 318 either moves away from the center of image plane 110 or completely out of view, depending on the degree of tilt of primary reflector 102. However, this would not be a factor in the imaging since the zoomed area is the area of interest. It is expected that this configuration can achieve at least a 5× zoom on the area of interest. Additionally, directional zooming can be achieved in the forward field of view 318 by moving at least one of the elements of the forward viewing lens group 106 along the optical axis 110.

Directional zooming can be implemented by incorporating a 360 degree rotational and two linear actuators in the support structure that holds the elements of the optical system 100. Depending on the specific size of the optical system 100 implemented, miniature rotation and linear actuators can be used. In one implementation, the rotational actuator can hold the two linear actuators at 180 degrees from each other beneath the base of the primary reflector 102. Directional zooming can be achieved by positioning the linear actuators at the desired position with the rotational actuator, the moving them in opposing directions to effect the desired tilt on the primary reflector 102. Miniature linear actuators can be incorporated in the structural support of the optical elements to properly align and position the elements based on the desired performance specifications of the optical system 100. Other options for achieving this will be apparent to someone of ordinary skill in the mechanical arts, and are regarded within the scope of this disclosure and its associated claims.

In conclusion, the optical system 100, in the various embodiments disclosed herein, provides the ability to collect signals from a continuous field over 360 degrees panoramically and approximately 270 degrees vertically. This technology has widespread medical, surveillance, military, communications and inspection applications. Medically, it can be integrated with various current and future internal imaging technologies including flexible and rigid endoscopes. The continuous extremely wide field of view provides unmatched capabilities for imaging across virtually all medical disciplines. Surveillance applications of optical system 100 are numerous. Mounted systems can provide extremely wide continuous fields of view and the system can be mounted in the forward position, ceiling mounted, or upright post mounted. The system can be used for either interior or exterior surveillance applications including but not limited to security, casino action monitoring, retail store monitoring, home monitoring and perimeter detection. Due to the extremely wide field of view it eliminates the need for pan and tilt systems that scan areas and also allows for the integration of commercial motion detection software. Wireless communication technology can be utilized with the compact optical system 100 to achieve remote surveillance capabilities. Military applications expand on the surveillance applications, providing surveillance and navigation technology for unmanned aerial and ground vehicles. Multiple systems can be linked to a remote monitoring station to provide widespread perimeter detection to a military post or installation. Finally, optical system 100 can be utilized for free space communication applications as an optical antenna. The wide field provides an ideal antenna for building to building, UAV to UAV, UAV to satellite, UAV to ground, and satellite to satellite communication. Optical inspection applications span many disciplines. Integrated in an industrial borescope, or a large scale pipe crawler, provides inspection ability to pipes or bores of all sizes. An additional inspection application is undercarriage vehicle inspection at checkpoints. Mounted on a base that vehicles drive over, it can provide single image inspection of the undercarriage of a vehicle and allow for means of image processing techniques for foreign object identification.

While these are examples of the many diverse applications to which optical system 100 is suited, it is important to recognize that this system is in fact suited to any application where is it desirable to receive and process signals over a full 360 degree panoramic view, as well as 270 degrees in the forward/vertical direction, in a seamless manner. Thus, the application of this technology to any application which requires such panoramic and forward/vertical viewing is regarded as being within the scope of this disclosure and its associated claims.

While only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

We claim:

1. An apparatus seamlessly integrating forward and panoramic fields to achieve a continuous wide field of view, comprising:
    a primary reflector, comprising a convex surface in relation to the forward field, reflective on at least part of said convex surface;
    a secondary reflector, forward of said primary reflector relative to said forward field, reflective on at least part a surface thereof facing rearward toward said primary reflector, comprising a substantially flat geometry facing rearward toward said primary reflector;
    a primary reflector hole in said primary reflector, substantially centered about an optical axis of said apparatus; and
    a secondary reflector hole in said secondary reflector, substantially centered about said optical axis, said secondary reflector hole comprising a diameter smaller than a diameter of said primary reflector hole;
    at least one field collecting element, forward of said secondary reflector relative to said forward field, substantially centered about said optical axis;
    at least one field focusing element, rearward of said primary reflector relative to said forward field, substantially centered about said optical axis; and
    said secondary and primary reflector holes comprising diameters selected for achieving said continuous wide field of view by accounting for the geometry of said primary reflector, the geometry of said secondary reflector, the separations of said primary reflector and said secondary reflector one from another along said optical axis, and a defined boundary location between said forward and panoramic fields of view; wherein:
    said primary reflector, said secondary reflector, said at least one field collecting element and said at least one field focusing element, as configured in combination, substantially match magnifications and F/#s as between said forward and panoramic fields and thereby project a substantially seamless boundary between said forward and panoramic fields onto a detection plane.

2. The apparatus of claim 1:
    said at least one field collecting element comprising at least two field collecting elements, with at least one of said field collecting elements movable along said optical axis.

3. The apparatus of claim 1, further comprising:
    at least one afocal element, rearward of said primary reflector relative to said forward field, substantially centered about said optical axis.

4. The apparatus of claim 1, further comprising:
    at least one field collecting element, forward of said secondary reflector relative to said forward field, substantially centered about said optical axis; and
    at least one field focusing element, rearward of said primary reflector relative to said forward field, substantially centered about said optical axis.

5. The apparatus of claim 4, wherein:
    said primary reflector, said secondary reflector, at least one field collecting element and said at least one field focusing element are configured, in combination, to project a substantially seamless boundary between said forward and panoramic fields onto a detection plane.

6. The apparatus of claim 4, further comprising:
    a detector substantially in a focal plane of said at least one field focusing element.

7. The apparatus of claim 6, said detector comprising an optical detector.

8. The apparatus of claim 6, said detector comprising an infrared detector.

9. The apparatus of claim 6, said detector comprising an detector for communications waves.

10. The apparatus of claim 1:
    said convex surface of said primary reflector comprising a substantially spherical geometry.

11. The apparatus of claim 1:
    said convex surface of said primary reflector comprising a substantially hyperbolic geometry.

12. The apparatus of claim 1:
    said convex surface of said primary reflector comprising a substantially parabolic geometry.

13. The apparatus of claim 1, said secondary reflector comprising a concave geometry facing rearward toward said primary reflector.

14. The apparatus of claim 1, said secondary reflector comprising a convex geometry facing rearward toward said primary reflector.

15. The apparatus of claim 1, wherein said primary reflector can be tilted relative to said optical axis.

16. The apparatus of claim 1, wherein said forward and panoramic fields comprise optical fields in the visible light spectrum.

17. The apparatus of claim 1, wherein said forward and panoramic fields comprise optical fields in the infrared light spectrum.

18. The apparatus of claim 1, wherein said forward and panoramic fields comprise electromagnetic waves.

19. The apparatus of claim 1, wherein said forward and panoramic fields comprise electromagnetic waves traveling in free space for communication.

20. A method for receiving signals with seamlessly integrated forward and panoramic fields thereby achieving a continuous wide field of view, comprising:

providing a primary reflector, comprising a convex surface in relation to the forward field, reflective on at least part of said convex surface;

facing a substantially flat geometry of a secondary reflector, forward of said primary reflector relative to said forward field, reflective on at least part a surface thereof, rearward toward said primary reflector;

substantially centering a primary reflector hole in said primary reflector, about an optical axis of said primary reflector and said secondary reflector;

substantially centering a secondary reflector hole in said secondary reflector, about said optical axis, wherein a diameter of said secondary reflector hole is smaller than a diameter of said primary reflector hole;

substantially centering at least one field collecting element, forward of said secondary reflector relative to said forward field, about said optical axis;

substantially centering at least one field focusing element, rearward of said primary reflector relative to said forward field, about said optical axis; and selecting a diameter of said secondary reflector hole and a diameter of said primary reflector hole to achieve said continuous wide field of view by accounting for the geometry of said primary reflector, the geometry of said secondary reflector, the separations of said primary reflector and said secondary reflector one from another along said optical axis, and a defined boundary location between said forward and panoramic fields of view; wherein:

said primary reflector, said secondary reflector, said at least one field collecting element and said at least one field focusing element, as configured in combination, substantially match magnifications and F/#s as between said forward and panoramic fields and thereby project a substantially seamless boundary between said forward and panoramic fields onto a detection plane.

21. The method of claim 20, wherein said at least one field collecting element comprises at least two field collecting elements, further comprising:

moving at least one of said field collecting elements along said optical axis.

22. The method of claim 20, further comprising:

substantially centering at least one afocal element, rearward of said primary reflector relative to said forward field, about said optical axis.

23. The method of claim 20, further comprising:

substantially centering at least one field collecting element, forward of said secondary reflector relative to said forward field, about said optical axis; and substantially centering at least one field focusing element, rearward of said primary reflector relative to said forward field, about said optical axis.

24. The apparatus of claim 23, further comprising:

configuring said primary reflector, said secondary reflector, at least one field collecting element and said at least one field focusing element are, in combination, to project a substantially seamless boundary between said forward and panoramic fields onto a detection plane.

25. The method of claim 23, further comprising:

providing a detector substantially in a focal plane of said at least one field focusing element.

26. The method of claim 25, said detector comprising an optical detector.

27. The method of claim 25, said detector comprising an infrared detector.

28. The apparatus of claim 6, said detector comprising an detector for communications waves.

29. The method of claim 20:

said convex surface of said primary reflector comprising a substantially spherical geometry.

30. The method of claim 20:

said convex surface of said primary reflector comprising a substantially hyperbolic geometry.

31. The method of claim 20:

said convex surface of said primary reflector comprising a substantially parabolic geometry.

32. The method of claim 20, further comprising:

facing a concave geometry of said secondary reflector rearward toward said primary reflector.

33. The method of claim 20, further comprising:

facing a convex geometry of said secondary reflector rearward toward said primary reflector.

34. The method of claim 20, further comprising:

tilting said primary reflector relative to said optical axis.

35. The apparatus of claim 20, said receiving further comprising:

receiving optical fields in the visible light spectrum.

36. The apparatus of claim 20, said receiving further comprising:

receiving optical fields in the infrared light spectrum.

37. The apparatus of claim 20, said receiving further comprising:

receiving electromagnetic waves.

38. The apparatus of claim 20, said receiving further comprising:

communicating through free space by receiving electromagnetic waves.

* * * * *